(12) United States Patent
Kang et al.

(10) Patent No.: US 9,164,308 B2
(45) Date of Patent: Oct. 20, 2015

(54) OPTICAL COMPENSATION STRUCTURE AND DISPLAY DEVICE

(75) Inventors: Chih-Tsung Kang, Guangdong (CN); Bo Hai, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 110 days.

(21) Appl. No.: 13/702,582

(22) PCT Filed: Sep. 7, 2012

(86) PCT No.: PCT/CN2012/081095
§ 371 (c)(1),
(2), (4) Date: Dec. 7, 2012

(87) PCT Pub. No.: WO2014/029139
PCT Pub. Date: Feb. 27, 2014

(65) Prior Publication Data
US 2014/0055720 A1    Feb. 27, 2014

(30) Foreign Application Priority Data
Aug. 22, 2012   (CN) .......................... 2012 1 0300730

(51) Int. Cl.
*G02F 1/1335* (2006.01)
*G02F 1/13363* (2006.01)

(52) U.S. Cl.
CPC ........ *G02F 1/1335* (2013.01); *G02F 1/133528* (2013.01); *G02F 1/133634* (2013.01); *G02F 2413/08* (2013.01)

(58) Field of Classification Search
CPC .................. G02F 2001/133742; G02F 1/1335; G02F 2413/08; G02F 1/13363; G02F 1/133528
See application file for complete search history.

(56) References Cited

U.S. PATENT DOCUMENTS

| | | | | |
|---|---|---|---|---|
| 2005/0030447 | A1* | 2/2005 | Hsu et al. | 349/102 |
| 2005/0162593 | A1* | 7/2005 | Miyachi | 349/119 |
| 2006/0103798 | A1* | 5/2006 | Jang et al. | 349/119 |

* cited by examiner

*Primary Examiner* — Dennis Y Kim

(57) ABSTRACT

An optical compensation structure and a display device are disclosed. The former comprises a front side polarizer and a rear side polarizer arranged at both sides of a VA liquid crystal unit; wherein the front side polarizer includes a front side polarization unit as well as a biaxial film arranged between the front side polarization unit and the VA liquid crystal unit; the rear side polarizer includes a rear side polarization unit as well as a first rear side TAC film arranged between the rear side polarization unit and the VA liquid crystal unit. The region having serious dark-state light leakage can be transferred from a horizontal viewing angle to a vertical viewing angle, which improves the display effect. There is no addition of the number of layers of the biaxial film, which reduces the cost.

16 Claims, 7 Drawing Sheets

OPTICAL COMPENSATION STRUCTURE AND DISPLAY DEVICE

FIELD OF THE INVENTION

The present invention relates to the liquid crystal display, and particularly to an optical compensation structure and a display device used in the VA display mode.

BACKGROUND OF THE INVENTION

With the observation angle of TFT-LCD increasing, the image contrast has been reduced continuously, and the image definition has been decreased. This is due to the birefringence of liquid crystal molecules in the liquid crystal layer changing along with the observation angle. Compensating with a compensation film of a wide viewing angle can reduce light leakage of the dark state image effectively, and increase the image contrast significantly in a certain range of viewing angles. The compensation film has the general compensation principle of correcting the phase difference generated by the liquid crystal at different viewing angles, so that the birefringent property of the liquid crystal molecules is symmetrically compensated. Different compensation films are used for different liquid crystal display modes. The compensation films used in a large-sized liquid crystal TV are mostly targeted in the VA display mode, including N-TAC of the Konica company in the early stage, and Zeonor of the OPOTES company, the F-TAC series of the Fujitsu company, X-plate of the Nitto Denko, etc. developed continuously afterwards.

FIG. 1 is an exploded drawing of the display device in the existing technology. As shown in FIG. 1, this display device includes a VA (Vertical Alignment) liquid crystal unit 300 and an optical compensation structure, the latter further including a front side polarizer 100 and a rear side polarizer 200 arranged at both sides of the VA liquid crystal unit 300. Wherein the front side polarizer 100 is arranged at the side in the light-exiting direction of the VA liquid crystal unit 300 (as shown by the arrowhead in FIG. 1; here the light-exiting direction is defined to be the direction of the backlight source oriented to the viewer), including a front side polarization unit 110 as well as a TAC film 120 arranged between the front side polarization unit 110 and the VA liquid crystal unit 300. Generally, the front side polarization unit 110 includes another TAC film as well as a PVA film arranged between this another TAC film and the TAC film 120. The rear side polarizer 200 includes a rear side polarization unit 220 as well as a rear side biaxial film 210 arranged between the rear side polarization unit 220 and the VA liquid crystal unit 300, the rear side biaxial film 210 having the function of both a delay film and a protection film. Generally, the rear side polarization unit 220 includes a TAC film as well as a PVA film arranged between this TAC film and the rear side biaxial film 210.

The above optical compensation structure includes one layer of biaxial film, and is therefore also usually called a single-layered biaxial film compensation structure. FIG. 2 is a dark-state light leakage profile of the single-layered biaxial film compensation structure. It shows the full viewing angle dark-state light leakage distribution of the single-layered biaxial film compensation structure, indicating that there is serious light leakage at phi=20°-40°, phi=140°-160°, phi=200°-220° and phi=310°-330°, i.e. there is serious dark-state light leakage at a viewing angle close to the horizontal position. However, the position of a viewer relative to the TV determines that the viewer is easier to see at a viewing angle close to the horizontal position. Therefore, the contrast and definition at the horizontal viewing angle have the biggest influence on the viewing effect.

In order to resolve the above problem, the solution commonly used at present is substituting the double-layered biaxial film compensation structure for the above single-layered biaxial film compensation structure. Still as shown in FIG. 1, in the double-layered biaxial film compensation structure, the biaxial film is substituted for the original TAC film 120, making both the front side polarizer 100 and the rear side polarizer 200 as a polarizer with the biaxial delay film.

FIG. 3 is a dark-state light leakage profile of the double-layered biaxial film compensation structure. It shows the full viewing angle dark-state light leakage distribution of the double-layered biaxial film compensation structure, indicating that there is serious light leakage at phi=30°-60°, phi=120°-150°, phi=210°-240° and phi=300°-330°, which are between the horizontal and vertical viewing angles. Generally, the contrast and definition at the horizontal viewing angle have the biggest influence on the viewing effect, while it is difficult to view at a big viewing angle (close to the vertical viewing angle), which thus has smaller influence on the viewer. It can thus be seen that using a double-layered biaxial film compensation structure can improve the viewing effect. However, although the double-layered biaxial film compensation structure improves the display effect, it will increase the cost of the optical compensation structure, which makes the display device thus produced in an inferior position in the market competition.

CONTENTS OF THE INVENTION

Aiming at the defect in the existing technology that the cost is increased caused by resolving the dark-state light leakage at the horizontal viewing angle with the double-layered biaxial film compensation structure, the technical problem to be resolved by the present invention is to provide an optical compensation structure and a display device.

The present invention adopts the following technical solution to solve its technical problem: According to one aspect of the present invention, an optical compensation structure is provided, comprising a front side polarizer and a rear side polarizer arranged at both sides of a VA liquid crystal unit; wherein:

the front side polarizer, arranged at a side in the light-exiting direction of the VA liquid crystal unit, includes a front side polarization unit as well as a biaxial film arranged between the front side polarization unit and the VA liquid crystal unit; and the rear side polarizer includes a rear side polarization unit as well as a first rear side TAC film arranged between the rear side polarization unit and the VA liquid crystal unit.

In the optical compensation structure according to the examples of the present invention, the slow axis of the biaxial film is perpendicular to the absorption axis of the front side polarization unit.

In the optical compensation structure according to the examples of the present invention, the front side polarization unit includes a front side TAC film as well as a front side PVA film arranged between the front side TAC film and the biaxial film; wherein the slow axis of the front side TAC film is perpendicular to the absorption axis of the front side PVA film, and parallel to the slow axis of the biaxial film.

In the optical compensation structure according to the examples of the present invention, the slow axis of the first rear side TAC film is perpendicular to the absorption axis of the rear side polarization unit.

In the optical compensation structure according to the examples of the present invention, the rear side polarization unit includes a second rear side TAC film as well as a rear side PVA film arranged between the second rear side TAC film and the first rear side TAC film; wherein the absorption axis of the rear side PVA film is perpendicular to the absorption axis of the front side PVA film, and the slow axis of the second rear side TAC film is parallel to the slow axis of the first rear side TAC film.

In the optical compensation structure according to the examples of the present invention, the biaxial film has an in-plane delay Ro of 50.4-84 nm at the wavelength of 550 nm, and a thickness direction delay Rth-b of 168-280 nm at the wavelength of 550 nm.

In the optical compensation structure according to the examples of the present invention, the thickness direction delay Rth-t of the first rear side TAC film at the wavelength of 550 nm has a lower limit Y1 and an upper limit Y2 that are respectively defined through the following formulas:

$$Y1 = 0.00451 \times Rth\text{-}b^2 - 2.7985 \times Rth\text{-}b + 444.44,$$

$$Y2 = -0.0009256 \times Rth\text{-}b^2 - 0.52686 \times Rth\text{-}b + 256.02.$$

In the optical compensation structure according to the examples of the present invention, the in-plane delay Ro and the thickness direction delay Rth-b are regulated by changing thickness and/or refractive index of the biaxial film.

According to another aspect of the present invention, a display device is further provided, comprising a VA liquid crystal display unit and the above optical compensation structure; wherein the optical compensation structure has a front side polarizer arranged at the side in the light-exiting direction of the VA liquid crystal unit, and a rear side polarizer arranged at the other side of the VA liquid crystal unit.

In the display device according to the examples of the present invention, the VA liquid crystal unit is a multi-quadrant liquid crystal unit.

The present invention has the following beneficial effects: In the optical compensation structure and display device according to the examples of the present invention, through the substitution of the biaxial film for the existing front side TAC film in the front side polarizer and the substitution of the TAC film for the existing biaxial film in the rear side polarizer, the region having serious dark-state light leakage can be transferred from a horizontal viewing angle to a vertical viewing angle, which improves the display effect compared with the existing single-layered biaxial film compensation structure. Meanwhile, there is no addition of the number of layers of the biaxial film by only using the single-layered biaxial film, which reduces the cost compared with the existing double-layered biaxial film compensation structure.

BRIEF DESCRIPTIONS OF THE DRAWINGS

The present invention will further be explained with reference to drawings and examples. In the drawings.

DETAILED DESCRIPTION OF THE EMBODIMENTS

Figure 1:
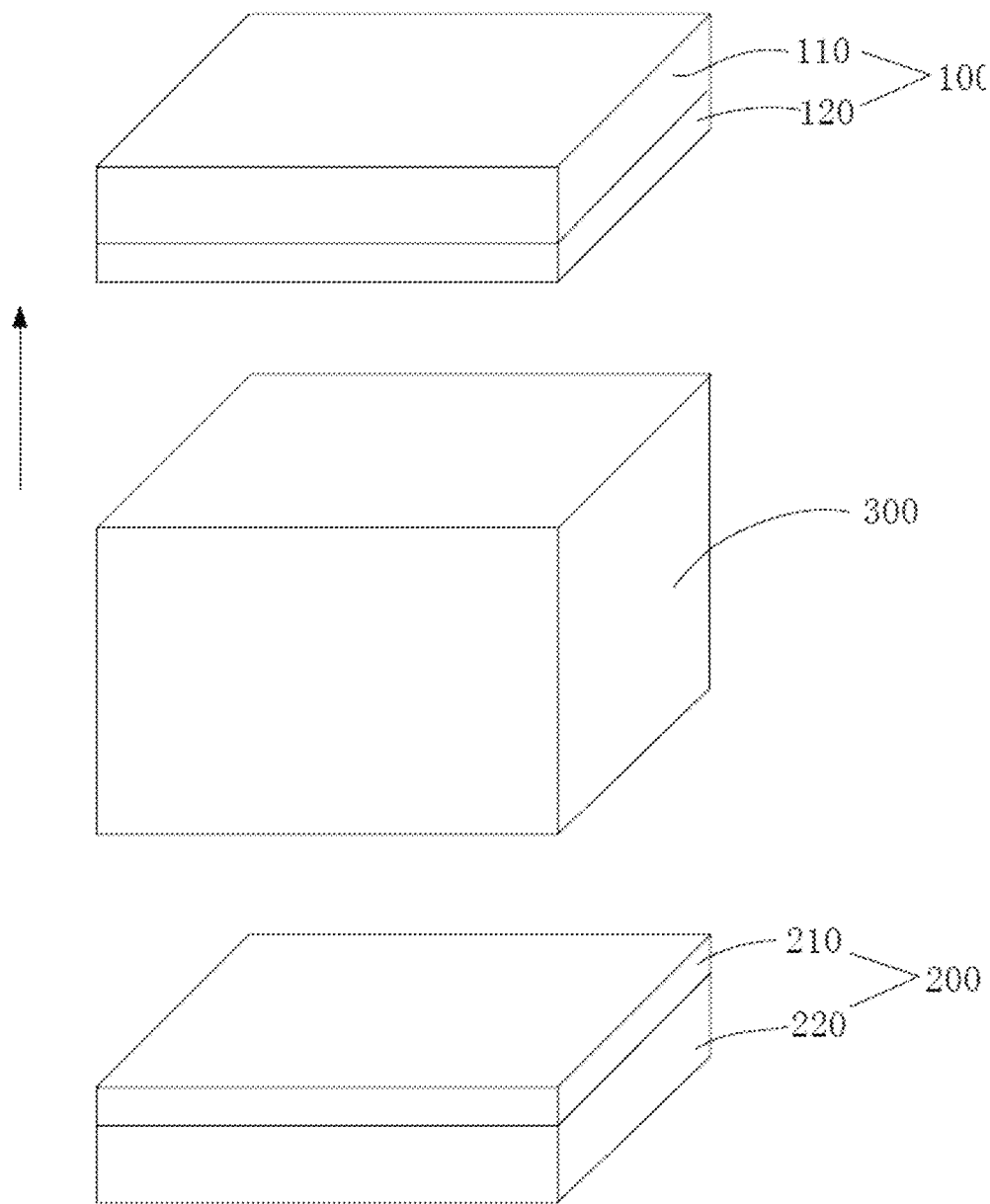
FIG. 1 is an exploded drawing of the display device in the existing technology.

In order to make the purpose, technical solutions and advantages of the present invention clearer, the present invention will further be explained in detail with reference to drawings and examples. It should be understood that the specific examples described here are only used for explaining the present invention rather than for limiting the present invention.

This application contains the terms "rear side" and "front side", which are orientation nouns for convenient description, wherein the "rear side" refers to being located between the liquid crystal unit and the backlight source, and the "front side" refers to being located between the liquid crystal unit and an viewer or the other side of the liquid crystal unit opposite to the backlight source. Besides, an arrowhead is further used in the drawing to indicate the light-exiting direction of the liquid crystal unit, and the light-exiting direction is defined here to be the direction of the backlight source oriented to the viewer. It should be understood that each of the terms adopted above are only used for convenient description rather than for limiting the present invention.

Figure 4:
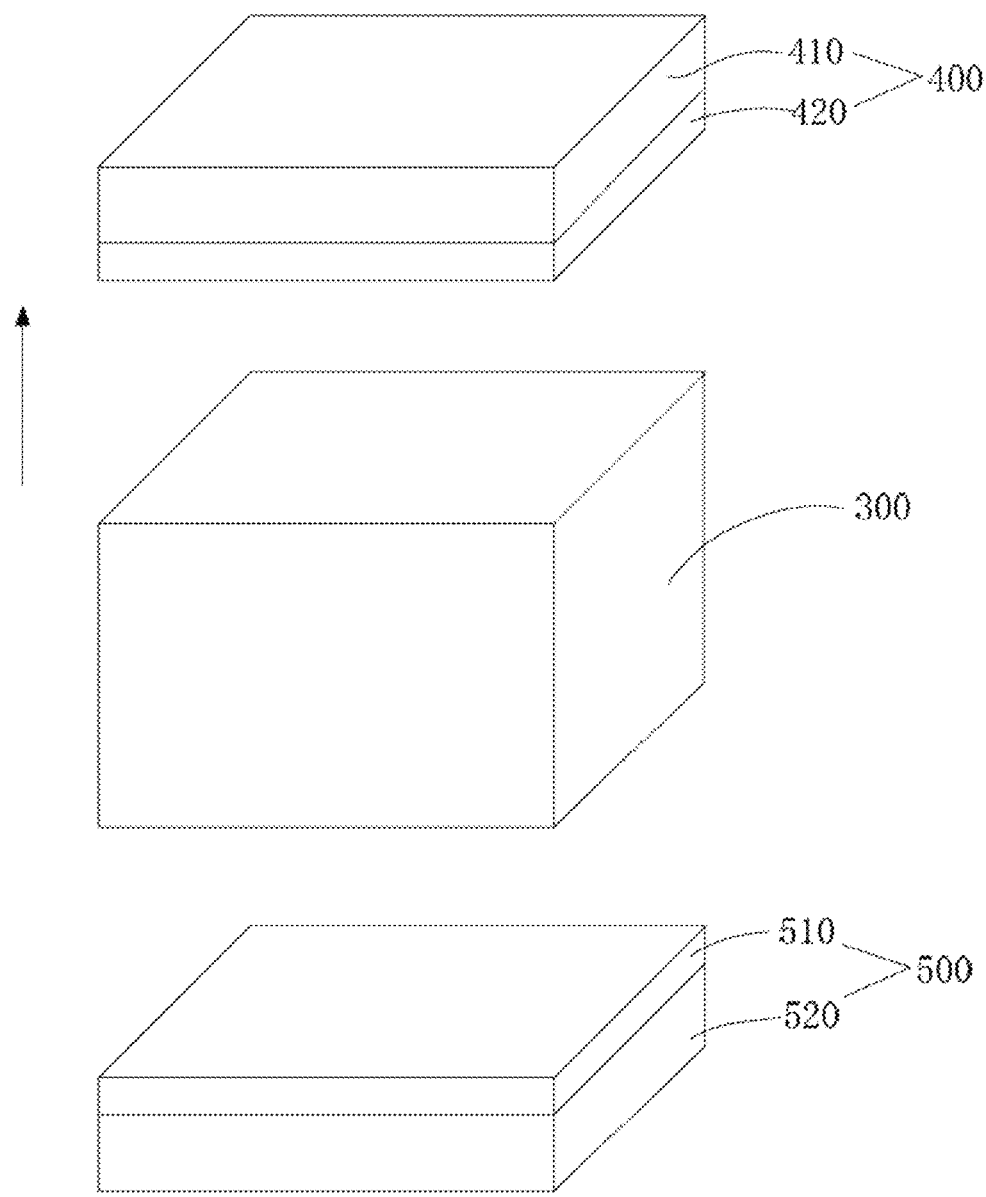
FIG. 4 is an exploded drawing of the optical compensation structure according to the examples of the present invention.

FIG. 4 shows the optical compensation structure according to the examples of the present invention, which comprises a front side polarizer 400 and a rear side polarizer 500 arranged at both sides of a VA liquid crystal unit 300. Wherein the front side polarizer 400 is arranged at the side in the light-exiting direction of the VA liquid crystal unit 300 (as shown by the arrowhead in FIG. 4), including a front side polarization unit 410 as well as a biaxial film 420 arranged between the front side polarization unit 410 and the VA liquid crystal unit 300. The rear side polarizer 500 includes a rear side polarization unit 520 as well as a first rear side TAC film 510 arranged between the rear side polarization unit 520 and the VA liquid crystal unit 300. Preferably, the slow axis of the biaxial film 420 is perpendicular to the absorption axis of the front side polarization unit 410; and the slow axis of the first rear side TAC film 510 is perpendicular to the absorption axis of the rear side polarization unit 520.

Figure 5:
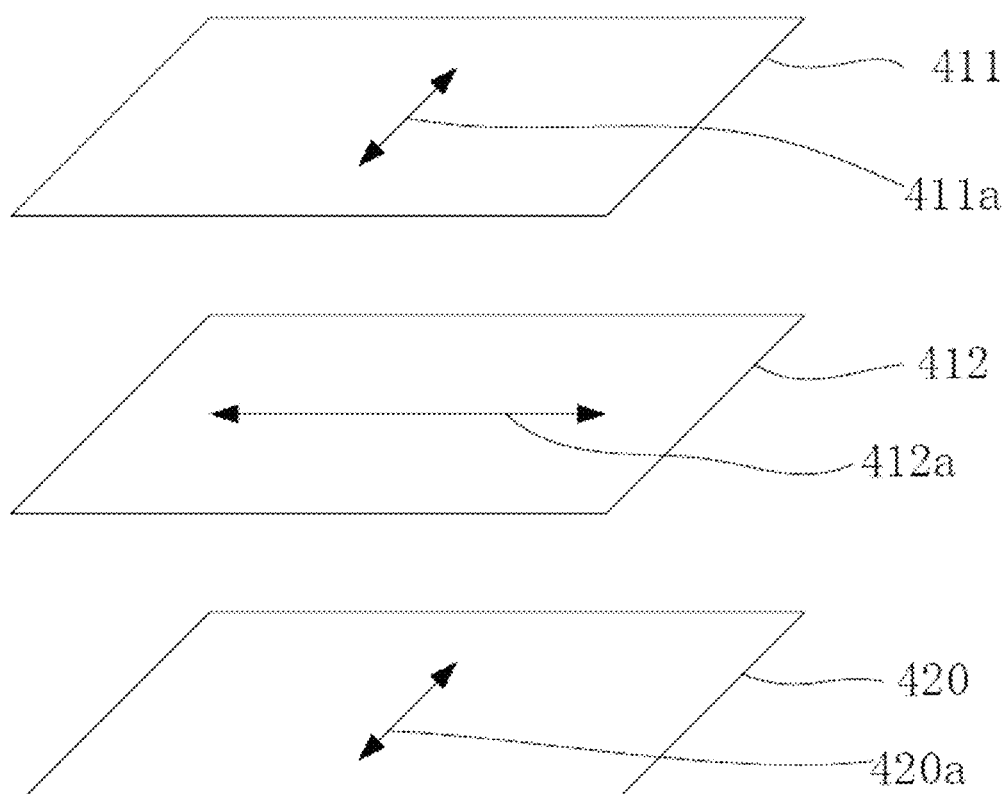
FIG. 5 is an exploded drawing of the front side polarizer 400 as shown in FIG. 4.

Specifically, FIG. 5 is an exploded drawing of the front side polarizer 400 as shown in FIG. 4, the front side polarization unit of this front side polarizer 400 including a front side TAC film 411 as well as a front side PVA film 412 arranged between the front side TAC film 411 and the biaxial film 420; wherein the slow axis 411a of the front side TAC film 411 is perpendicular to the absorption axis 412a of the front side PVA film 412, and the slow axis 411a of the front side TAC film 411 is parallel to the slow axis 420a of the biaxial film 420.

Figure 6:
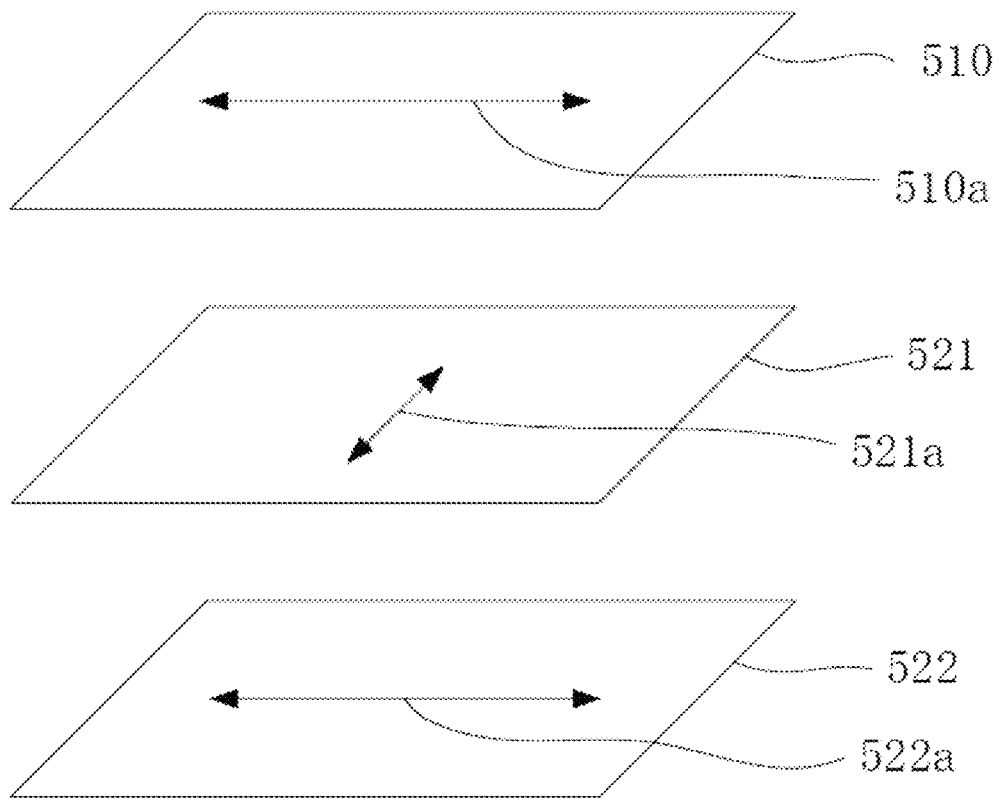
FIG. 6 is an exploded drawing of the rear side polarizer 500 as shown in FIG. 4.

FIG. 6 is an exploded drawing of the rear side polarizer 500 as shown in FIG. 4, wherein the rear side polarization unit 520 includes a second rear side TAC film 522 as well as a rear side PVA film 521 arranged between the second rear side TAC film 522 and the first rear side TAC film 510. Wherein the absorption axis 521$a$ of the rear side PVA film 521 is perpendicular to the absorption axis 412$a$ of the front side PVA film 412, and the slow axis 522$a$ of the second rear side TAC film 522 is parallel to the slow axis 510$a$ of the first rear side TAC film 510 and perpendicular to the absorption axis 521$a$ of the rear side PVA film 521.

Figure 2:
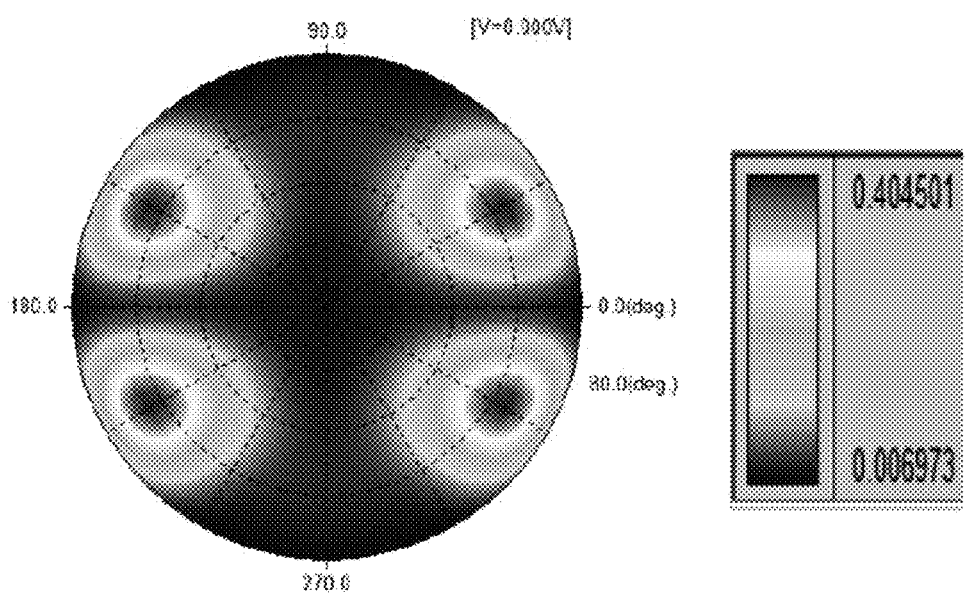
FIG. 2 is a dark-state light leakage profile of the single-layered biaxial film compensation structure in the existing technology.
Figure 3:
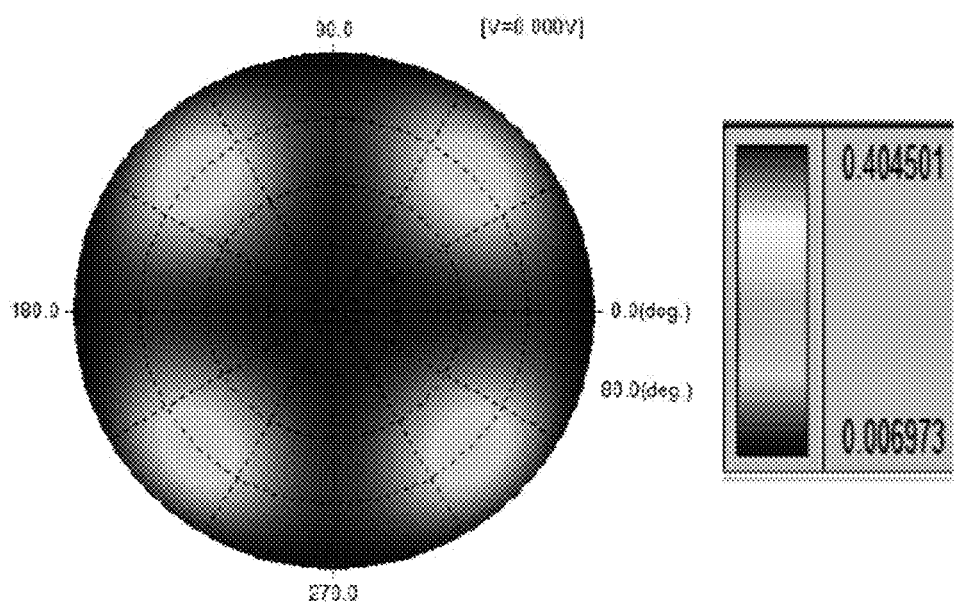
FIG. 3 is a dark-state light leakage profile of the double-layered biaxial film compensation structure in the existing technology.
Figure 7:
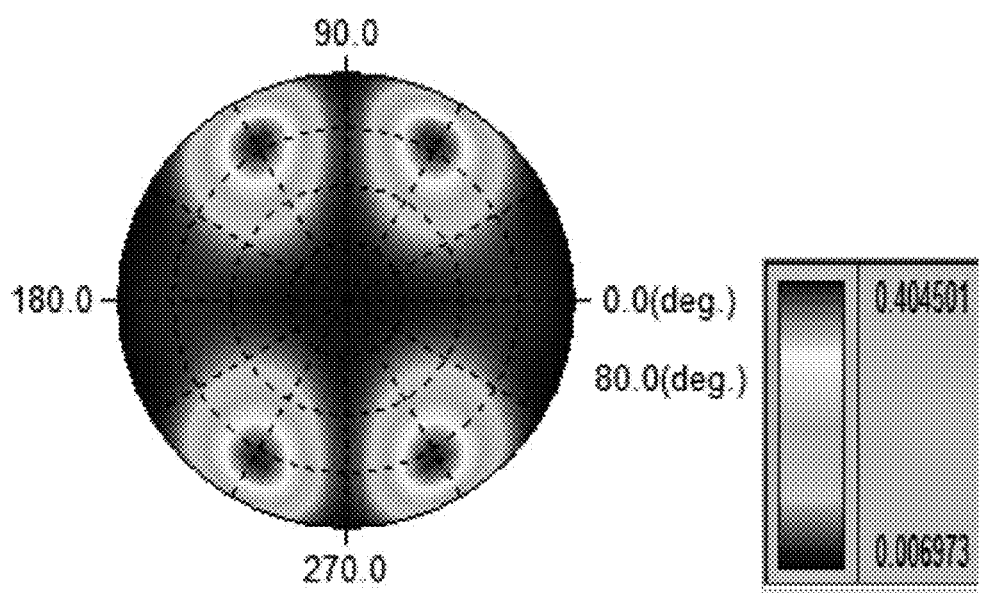
FIG. 7 is a dark-state light leakage profile of the optical compensation structure according to the examples of the present invention.

It can be seen from above that the optical compensation structure according to the examples of the present invention, compared with the existing double-layered biaxial film compensation structure, only needs one layer of the biaxial film 420; compared with the existing single-layered biaxial film compensation structure, the biaxial film 420 is arranged between the front side polarization unit and the liquid crystal unit, and no longer between the liquid crystal unit and the rear side polarization unit. FIG. 7 is a dark-state light leakage profile of the optical compensation structure according to the examples of the present invention. It shows the full viewing angle dark-state light leakage distribution of the single-layered biaxial film compensation structure, indicating that there is serious light leakage at phi=50°-70°, phi=110°-130°, phi=230°-250° and phi=290°-310°. Compared with the dark-state light leakage profile of the single-layered biaxial film compensation structure in the existing technology as shown in FIG. 2, the region having serious dark-state light leakage has been close to the up-and-down vertical viewing angle, while the dark-state light leakage close to the horizontal viewing angle is significantly reduced, and thus contrast and definition close to the horizontal viewing angle can be effectively increased. Meanwhile, with only one layer of the biaxial film 420 needed, the cost is not increased.

In order to ensure that the light leakage is concentrated near the up-and-down vertical viewing angle and the amount and range of light leakage are as small as possible, the delay value of the biaxial film 420 is further regulated, or the delay values of the biaxial film 420 and the first rear side TAC film 510 are further regulated at the same time. In the simulation process, the optical compensation structure includes the structure as shown in FIGS. 4-6; the VA liquid crystal unit 300 has a pretilt angle of 85° to 89°, a liquid crystal inclination in the four quadrants respectively of 45°, 135°, 225° and 315°, and a liquid crystal phase difference LC Δnd within the range of (324.3, 342.8) nm, i.e. at the wavelength 550 nm; the blue light-YAG (Yttrium Aluminum Garnet) of LED spectrum is used as the light source, with the central luminance defined to be 100 nit and the light source distribution to be the Lambert distribution.

Figure 8:
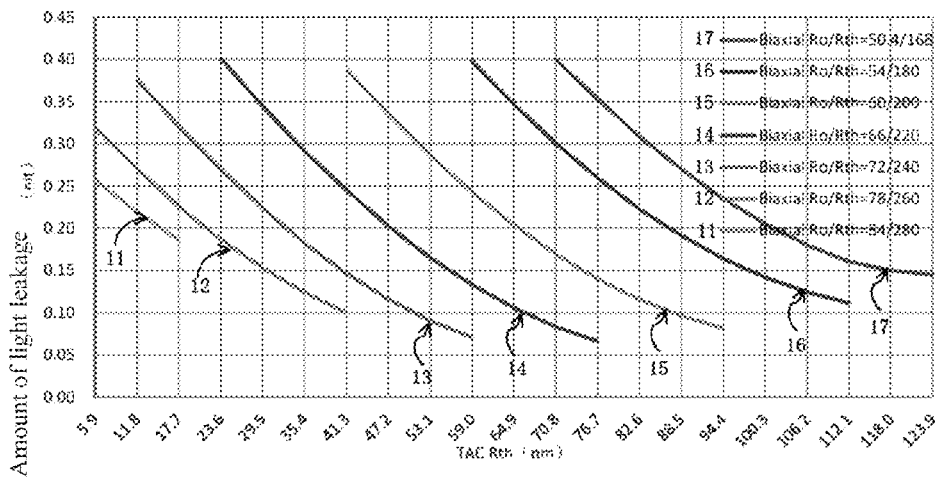
FIG. 8 shows a curve of change of the amount of light leakage with the delay value.
Figure 9:
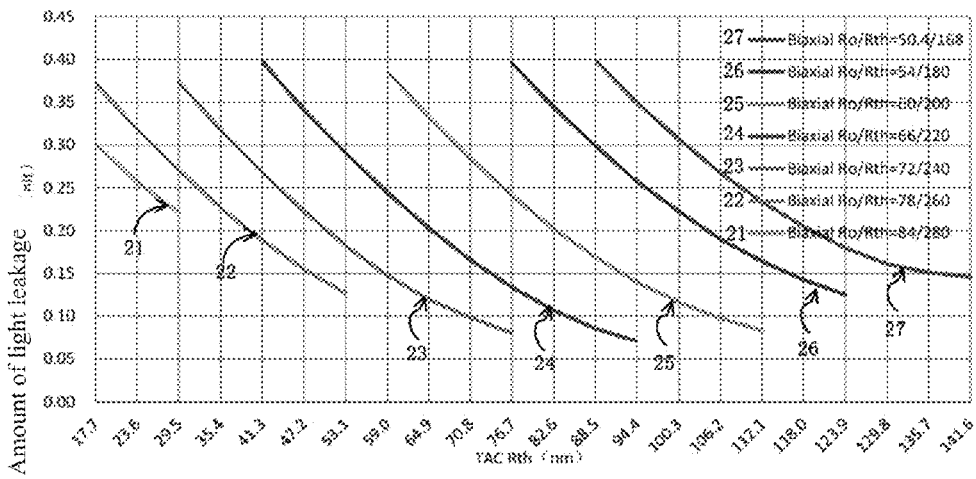
FIG. 9 shows a curve of change of the amount of light leakage with the delay value.

The simulation results are for example as shown in FIGS. 8 and 9 by the curve of change of the amount of light leakage with the delay value, wherein FIG. 8 is a curve of change of the amount of light leakage when LC ΔND=324.3 nm and the pretilt angle is 89°, with the in-plane delay Ro and thickness direction delay Rth-b of the biaxial film 420 as well as the thickness direction delay Rth-t of the first rear side TAC film 510 having different values; and FIG. 9 is a curve of change of the amount of light leakage when LC ΔND=342.8 nm and the pretilt angle is 89°, with the in-plane delay Ro and thickness direction delay Rth-b of the biaxial film 420 as well as the thickness direction delay Rth-t of the first rear side TAC film 510 having different values. In the drawings, the Biaxial Ro refers to the in-plane delay Ro of the biaxial film 420, the Biaxial Rth refers to the thickness direction delay Rth-b of the biaxial film 420, and the TAC Rth refers to the thickness direction delay Rth-t of the first rear side TAC film 510.

It was found in the simulation that at different pretilt angles, the delay values of the biaxial film 420 and the first rear side TAC film 510 have influences on the dark-state light leakage that are consistent in trend. That is, at different pretilt angles, the minimum dark-state light leakage corresponds to the same range of delay values. According to the simulation results, the range of delay values of the biaxial film 420 and the first rear side TAC film 510 can be obtained under the conditions that LC ΔND is within the range of (324.3, 342.8) nm, the pretilt angle is within the range of (85°-89°), and the dark-state light leakage is smaller than 0.2 nit (the dark-state light leakage value simulated when the pretilt angle=89°, not the actual measured value): the biaxial film 420 has an in-plane delay Ro of 50.4-84 nm at the wavelength of 550 nm, and a thickness direction delay Rth-b of 168-280 nm at the wavelength of 550 nm; the thickness direction delay Rth-t of the first rear side TAC film 510 at the wavelength of 550 nm has a lower limit Y1 and an upper limit Y2 that are respectively defined through the following formulas (1) and (2):

$$Y1=0.00451 \times Rth\text{-}b^2 - 2.7985 \times Rth\text{-}b + 444.44 \tag{1},$$

$$Y2=-0.0009256 \times Rth\text{-}b^2 - 0.52686 \times Rth\text{-}b + 256.02 \tag{2}.$$

It is known that the relation between the in-plane delay Ro and thickness direction delay Rth-b and the refractive index and thickness d of the biaxial film 420 satisfies the following formulas (3) and (4):

$$Ro=(Nx-Ny) \times d \tag{3},$$

$$Rth\text{-}b=[(Nx+Ny)/2-Nz] \times d \tag{4}.$$

Wherein Nx and Ny are the in-plane refractive index of the biaxial film 420, and Nz is the thickness refractive index. Thus the delay value can be changed through the following three methods: changing the delay value by changing the thickness d; with the thickness d constant, changing the delay value by changing the refractive index; and regulating the delay value by simultaneously changing the thickness d and refractive index.

Figure 10:
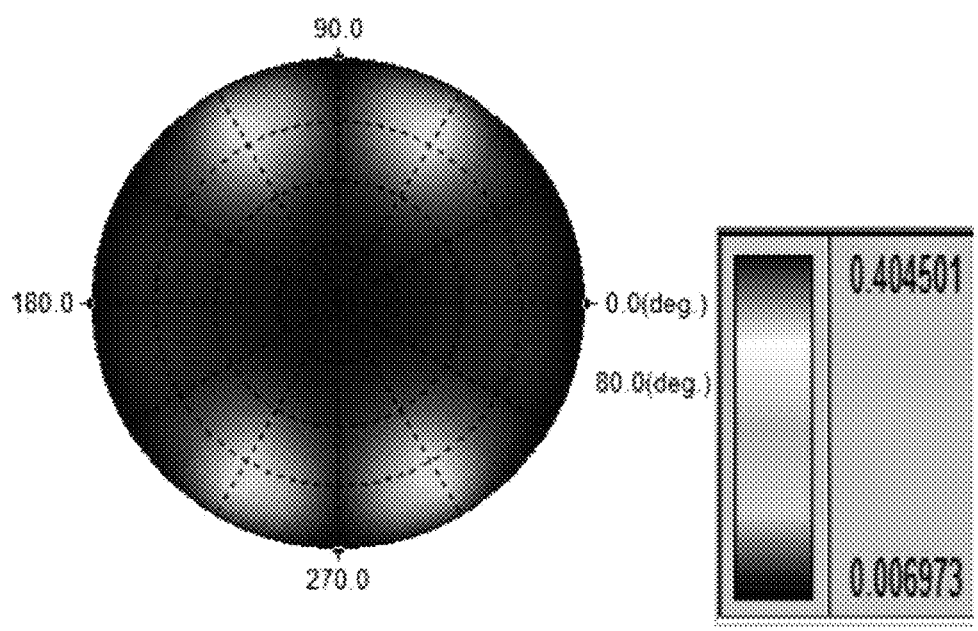
FIG. 10 is a dark-state light leakage profile of the optical compensation structure according to the present invention after using the delay value according to the examples of the present invention.

FIG. 10 is a dark-state light leakage profile of the optical compensation structure according to the present invention after using the delay value according to the examples of the present invention. Compared with the dark-state light leakage profile of the single-layered biaxial film compensation structure in the existing technology as shown in FIG. 2, the dark-state light leakage of the improved optical compensation structure is concentrated near the vertical viewing angle, the light leakage is concentrated within a smaller range of viewing angle, and the amount of light leakage is obviously smaller than the dark-state light leakage caused by the single-layered biaxial film compensation structure in the existing technology.

The VA-mode liquid crystal display device according to the examples of the present invention includes a VA liquid crystal display unit and the above optical compensation structure, here partly or fully with reference to the above optical compensation structure. Wherein the optical compensation structure has a front side polarizer 400 arranged at the side in the light-exiting direction of the VA liquid crystal unit 300, the rear side polarizer 500 is arranged at a rear side in the light-exiting direction of the VA liquid crystal unit 300. Besides, the VA liquid crystal unit 300 is a multi-quadrant liquid crystal unit, such as the multi-quadrant liquid crystal unit composed of four quadrants.

It should be understood that the TAC (cellulose triacetate) film, PVA (polyvinyl alcohol) film, and biaxial film used in this application can be the products of any type currently commercially available, and will no longer be enumerated here in detail.

It can be seen from above that, in the optical compensation structure and display device according to the examples of the present invention, through the substitution of the biaxial film for the existing front side TAC film in the front side polarizer and the substitution of the TAC film for the existing biaxial film in the rear side polarizer, the region having serious dark-state light leakage can be transferred from a horizontal viewing angle to a vertical viewing angle, which improves the display effect compared with the existing single-layered biaxial film compensation structure. Meanwhile, there is no addition of the number of layers of the biaxial film by only using the single-layered biaxial film, which reduces the cost compared with the existing double-layered biaxial film compensation structure. Besides, a suitable delay value is set for the above optical compensation structure and display device, which significantly reduces the amount of light leakage compared with the existing single-layered biaxial film compensation structure.

It should be understood that those skilled in the art can make improvement or transformation according to the above explanation, which shall all fall within the scope of protection of the claims of the present invention.

What is claimed is:

1. An optical compensation structure, characterized in that it comprises a front side polarizer and a rear side polarizer arranged at both sides of a VA liquid crystal unit; wherein: the front side polarizer, arranged at a side in the light-exiting direction of the VA liquid crystal unit, includes a front side polarization unit as well as a biaxial film arranged between the front side polarization unit and the VA liquid crystal unit; and the rear side polarizer includes a rear side polarization unit as well as a first rear side TAC film arranged between the rear side polarization unit and the VA liquid crystal unit;

the biaxial film has an in-plane delay Ro of 50.4-84 nm at the wavelength of 550 nm, and a thickness direction delay Rth-b of 168-280 nm at the wavelength of 550 nm;
the thickness direction delay Rth-t of the first rear side TAC film at the wavelength of 550 nm has a lower limit Y1 and an upper limit Y2 that are respectively defined through the following formulas:

$$Y1=0.00451 \times Rth\text{-}b^2 - 2.7985 \times Rth\text{-}b + 444.44,$$

$$Y2=-0.0009256 \times Rth\text{-}b^2 - 0.52686 \times Rth\text{-}b + 256.02.$$

2. The optical compensation structure according to claim 1, characterized in that the slow axis of the biaxial film is perpendicular to the absorption axis of the front side polarization unit.

3. The optical compensation structure according to claim 2, characterized in that the front side polarization unit includes a front side TAC film as well as a front side PVA film arranged between the front side TAC film and the biaxial film; wherein the slow axis of the front side TAC film is perpendicular to the absorption axis of the front side PVA film, and parallel to the slow axis of the biaxial film.

4. The optical compensation structure according to claim 1, characterized in that the slow axis of the first rear side TAC film is perpendicular to the absorption axis of the rear side polarization unit.

5. The optical compensation structure according to claim 4, characterized in that the rear side polarization unit includes a second rear side TAC film as well as a rear side PVA film arranged between the second rear side TAC film and the first rear side TAC film; wherein the absorption axis of the rear side PVA film is perpendicular to the absorption axis of the front side PVA film, and the slow axis of the second rear side TAC film is parallel to the slow axis of the first rear side TAC film.

6. The optical compensation structure according to claim 1, characterized in that the in-plane delay Ro and the thickness direction delay Rth-b are regulated by changing thickness and/or refractive index of the biaxial film.

7. A display device, characterized in that it includes a VA liquid crystal display unit and the optical compensation structure according to claim 1.

8. The display device according to claim 7, characterized in that a slow axis of the biaxial film is perpendicular to an absorption axis of the front side polarization unit.

9. The display device according to claim 8, characterized in that the front side polarization unit includes a front side TAC film as well as a front side PVA film arranged between the front side TAC film and the biaxial film; wherein the slow axis of the front side TAC film is perpendicular to the absorption axis of the front side PVA film, and parallel to the slow axis of the biaxial film.

10. The display device according to claim 9, characterized in that the VA liquid crystal unit is a multi-quadrant liquid crystal unit.

11. The display device according to claim 8, characterized in that the VA liquid crystal unit is a multi-quadrant liquid crystal unit.

12. The display device according to claim 7, characterized in that a slow axis of the first rear side TAC film is perpendicular to an absorption axis of the rear side polarization unit.

13. The display device according to claim 12, characterized in that the rear side polarization unit includes a second rear side TAC film as well as a rear side PVA film arranged between the second rear side TAC film and the first rear side TAC film; wherein the absorption axis of the rear side PVA film is perpendicular to the absorption axis of the front side PVA film, and the slow axis of the second rear side TAC film is parallel to the slow axis of the first rear side TAC film.

14. The display device according to claim 13, characterized in that the VA liquid crystal unit is a multi-quadrant liquid crystal unit.

15. The display device according to claim 12, characterized in that the VA liquid crystal unit is a multi-quadrant liquid crystal unit.

16. The display device according to claim 7, characterized in that the VA liquid crystal unit is a multi-quadrant liquid crystal unit.

* * * * *